Dec. 31, 1935.                    E. G. GARTIN                    2,026,309
LUBRICATOR
Filed July 5, 1932                                    3 Sheets-Sheet 1
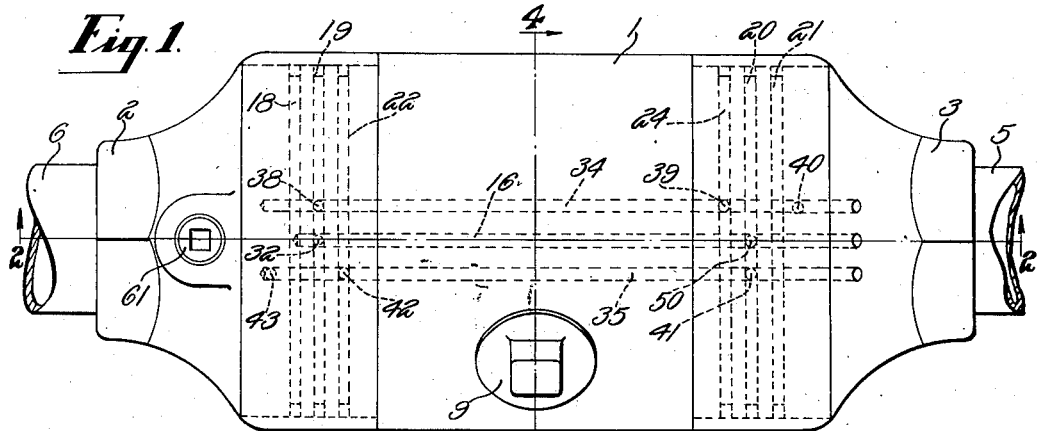
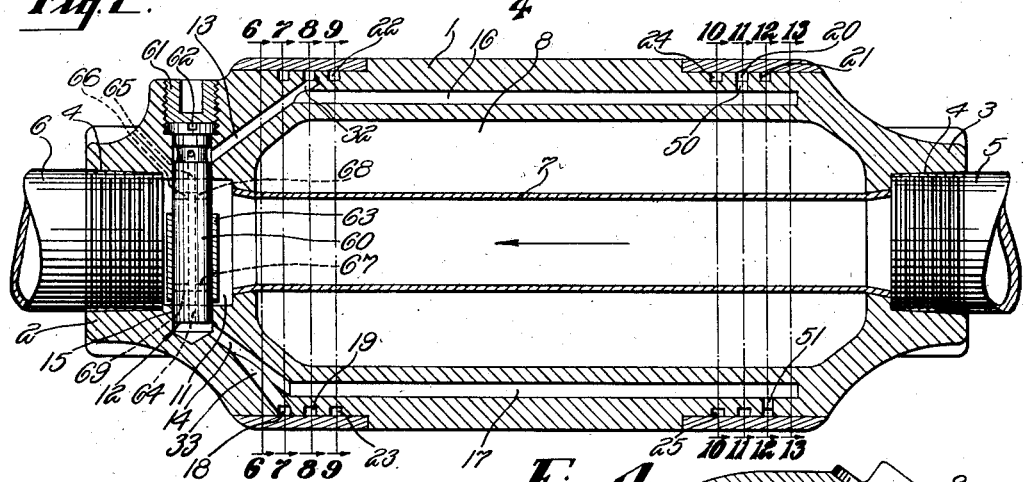
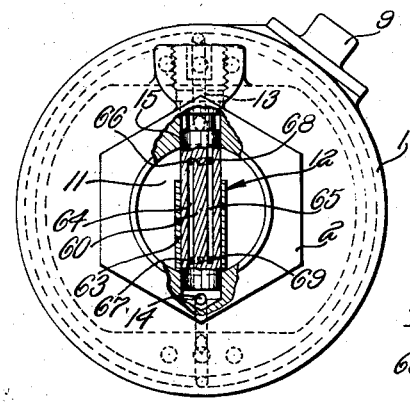
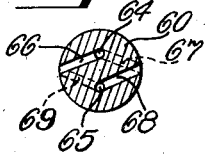
INVENTOR:
ELMER G. GARTIN.
BY
ATT'Y.

Dec. 31, 1935.    E. G. GARTIN    2,026,309
LUBRICATOR
Filed July 5, 1932    3 Sheets-Sheet 2
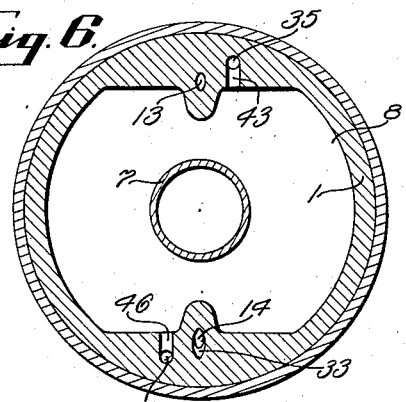
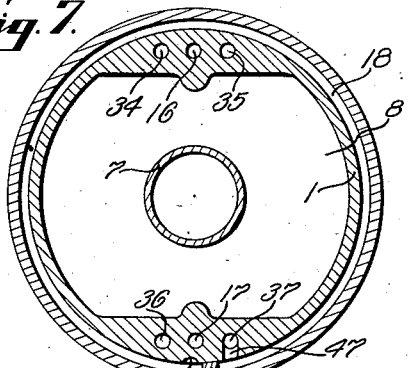
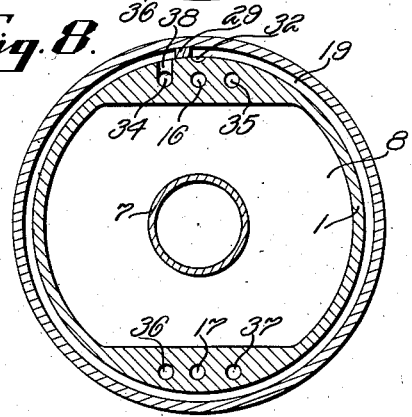
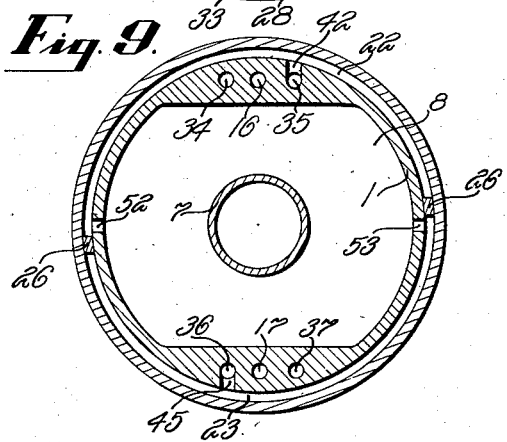
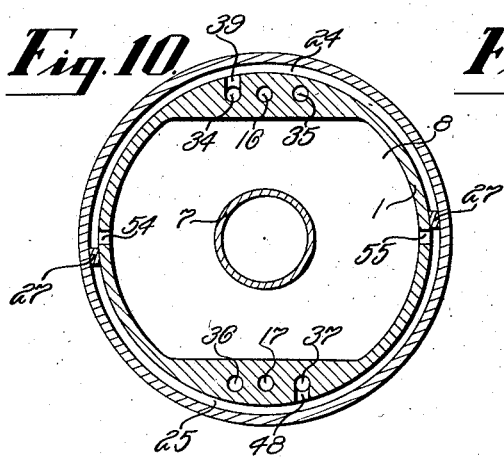
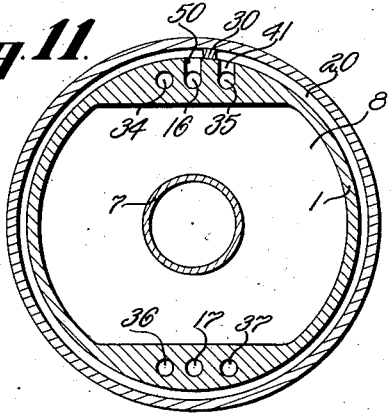
INVENTOR:
ELMER G. GARTIN.
BY
ATT'Y.

Dec. 31, 1935.    E. G. GARTIN    2,026,309
LUBRICATOR
Filed July 5, 1932    3 Sheets-Sheet 3
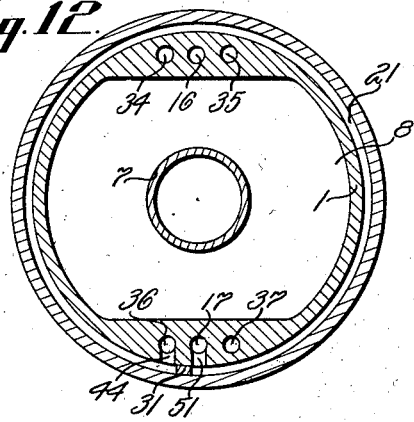
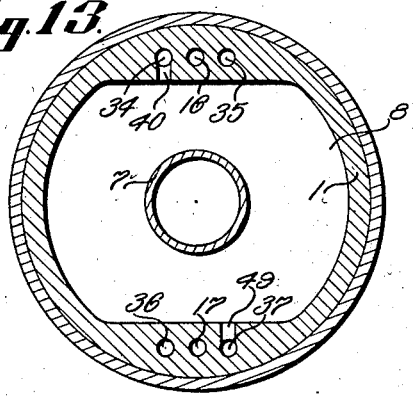
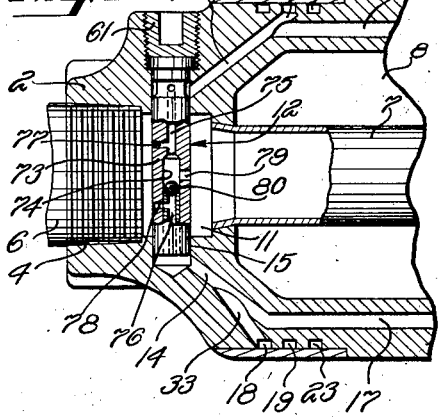
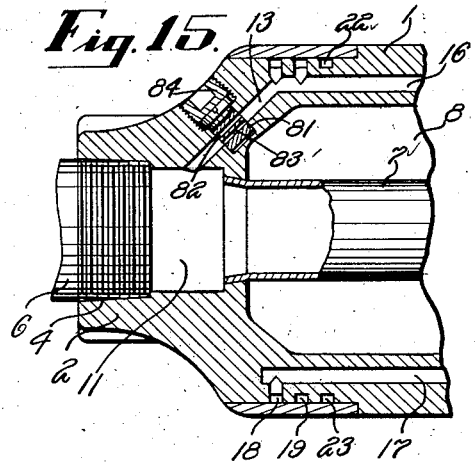
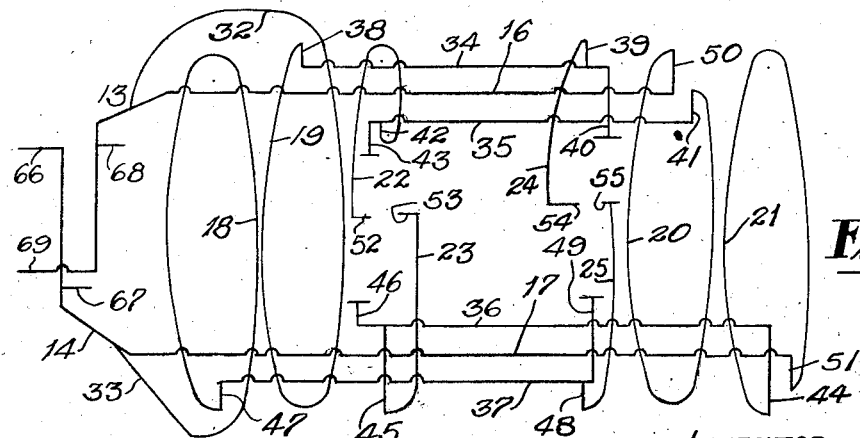
INVENTOR:
ELMER G. GARTIN.
BY  *Louis A. Maxson*
ATT'Y.

Patented Dec. 31, 1935

2,026,309

UNITED STATES PATENT OFFICE 2,026,309

LUBRICATOR

Elmer G. Gartin, Claremont, N. H., assignor to Sullivan Machinery Company, a corporation of Massachusetts Application July 5, 1932, Serial No. 620,905

26 Claims. (Cl. 184—55)

This invention relates to lubricators and more particularly to improvements in air line lubricators particularly adapted for use with air operated tools.

An object of this invention is to provide an improved lubricator. Another object is to provide an improved air line lubricator particularly adapted to use with air operated tools. A further object is to provide an improved lubricator of the above character which may be supported in any desired position and provide in such position for the flow of lubricant to the air line. Yet another object is to provide an improved air line lubricator whereby the lubricator may be supported in any desired position and provide in such position for the lubricant flow and wherein flow of lubricant to the air line, when the flow of pressure fluid through the air line is interrupted, is automatically prevented. These and other objects and advantages of the invention will, however, hereinafter more fully appear in the course of the following description and as more particularly pointed out in the appended claims.

In the accompanying drawings there are shown for purposes of illustration one form and two modifications thereof which the invention may assume in practice.

In these drawings:

Fig. 1 is a plan view of the illustrative embodiment of the improved lubricator;

Fig. 2 is a central longitudinally extending vertical sectional view taken substantially on line 2—2 of Fig. 1;

Fig. 3 is an end elevational view of the lubricator shown in Fig. 1, parts being shown in section to illustrate structural details;

Fig. 4 is a transverse vertical sectional view taken substantially on line 4—4 of Fig. 1;

Fig. 5 is a detail sectional view of the valve mechanism;

Fig. 6 is a transverse sectional view taken substantially on line 6—6 of Fig. 2;

Fig. 7 is a transverse sectional view taken substantially on line 7—7 of Fig. 2;

Fig. 8 is a transverse sectional view taken substantially on line 8—8 of Fig. 2;

Fig. 9 is a transverse sectional view taken substantially on line 9—9 of Fig. 2;

Fig. 10 is a transverse sectional view taken substantially on line 10—10 of Fig. 2;

Fig. 11 is a transverse sectional view taken substantially on line 11—11 of Fig. 2;

Fig. 12 is a transverse sectional view taken substantially on line 12—12 of Fig. 2;

Fig. 13 is a transverse sectional view taken substantially on line 13—13 of Fig. 2;

Fig. 14 is a detail sectional view illustrating a modified form of valve mechanism; and Fig. 15 is a detail sectional view illustrating a further modified form of construction.

Fig. 16 is a diagrammatic view showing the air and lubricant discharge passage arrangement of the form of the invention shown in Figs. 1 to 13 inclusive.

In this illustrative construction there is shown a lubricator particularly adapted to use in air lines for air operated tools and operative while air flows through the air line to operate the tool and irrespective of its supported position, to supply lubricant to the air line. In the form of construction shown in Figs. 1 to 13 inclusive and Fig. 16, the improved lubricator comprises a cylindrical casing 1 having integral end closures 2 and 3, the end closures being internally threaded at 4 for connection to an air inlet pipe 5 and discharge pipe 6 respectively, these inlet and discharge pipes being adapted for connection to the usual air line. The casing 1 is herein made hollow, and extending centrally through the casing is a tubular air conduit 7, the ends of which are secured as by flaring and welding within the end closures 2 and 3 of the lubricator casing in the manner shown. Extending annularly around the conduit 7 is a lubricant reservoir 8 having, as shown in Fig. 4, a suitable filler plug 9 and strainer screen 10. Arranged in a chamber 11 formed in the end closure 2 and through which air flows from the conduit 7 to the air discharge pipe 6, is a valve mechanism generally designated 12 to be later described in detail, and this valve mechanism controls flow of air under pressure and lubricant through an improved passage arrangement whereby lubricant may be supplied from the reservoir to the air line irrespective of the angular and endwise tilted positions of the lubricator casing and whereby, when the air supply to the lubricator is shut off, no lubricant may flow from the reservoir to the air line.

In this improved construction the lubricator casing 1 has formed therein passages 13 and 14 communicating with the valve chamber 15 (within which the valve mechanism 12 is arranged) at the opposite ends thereof and respectively communicating with longitudinal passages 16 and 17 formed in opposite walls of the casing 1. Also formed in the casing at the end thereof adjacent the end closure 2 are annular grooves 18 and 19 encircling the reservoir 8 and arranged in parallel transverse planes as shown, while formed in the casing at its opposite end adjacent the end closure 3 are similar annular grooves 20 and 21. Formed in the casing in transverse planes parallel with the grooves 18, 19 and 20, 21 are semi-circular grooves 22 and 23 also encircling the reservoir, herein arranged adjacent the annular groove 19, and similar semi-circular grooves 24 and 25 arranged adjacent the groove 20, these semi-circular grooves being shown in Figs. 9 and 10. The semi-circular grooves 22 and 23 are separated at the opposite sides of the casing by partitions 26, while the grooves 24 and 25 are separated by similar partitions 27. As shown in Figs. 7 and 8, the grooves 18 and 19 are provided with partitions 28 and 29 respectively, while, as shown in Figs. 11 and 12, the grooves 20 and 21 are provided with similar partitions 30 and 31 respectively. The passages 13 and 14 also communicate with the grooves 19 and 18 respectively through passages 32 and 33 as shown in Fig. 2. Arranged parallel with and preferably at the opposite sides of the passages 16 and 17 respectively are longitudinal passages 34, 35 and 36, 37, and the passage 34 communicates at 38 (see Fig. 8) with one end of the annular groove 19, through passage 39 (Fig. 10) with the semi-circular groove 24 and passage 40 (Fig. 13) with the lubricant reservoir 8. The passage 35 communicates through passage 41 (Fig. 11) with one end of the annular groove 20, through passage 42 (Fig. 9) with the semi-circular groove 22 and through passage 43 (Fig. 6) with the lubricant reservoir. The passage 36 communicates through passage 44 (Fig. 12) with one end of the annular groove 21, through passage 45 (Fig. 9) with the semi-circular groove 23 and through passage 46 (Fig. 6) with the lubricant reservoir, while the passage 37 communicates through passage 47 (Fig. 7) with one end of the annular groove 18, through passage 48 (Fig. 10) with the semi-circular groove 25 and through passage 49 (Fig. 13) with the lubricant reservoir. The passage 16 communicates with one end of the groove 20 through a port 50 (Fig. 11) while the passage 17 communicates with one end of the annular groove 21 through a port 51 (Fig. 12). As shown in Fig. 9, the semi-circular grooves 22 and 23 communicate respectively with the lubricant reservoir through ports 52 and 53, while, as shown in Fig. 10, the semi-circular grooves 24 and 25 respectively communicate with the lubricant reservoir through the ports 54 and 55. It will be noted that the passages 43 and 40 communicate with the lubricant reservoir at the opposite side thereof with respect to the conduit axis from the points of communication therewith of the passages 46 and 49, while the ports 52 and 54 communicate with the reservoir at the opposite side thereof from the points of communication thereof with the passages 53 and 55. The passages 52, 53, 54 and 55 are arranged in a transverse longitudinal plane at right angles to a vertical longitudinal plane including the axes of the passages 16, 17 and the conduit 7 so that one of the same may always act as a lubricant discharge passage, while another acts as an air inlet passage irrespective of the angular position of the lubricator casing about its longitudinal axis. It will also be noted that the ports 43, 46, 52, 53 and ports 40, 49, 54 and 55 communicate with the lubricant reservoir at the opposite ends thereof in transverse planes including the section lines 6—6, 9—9 and 13—13, 10—10, in Fig. 2, so that one of the ports always acts as a lubricant discharge passage, while another acts as an air inlet passage irrespective of the endwise tilted position of the lubricator casing. The partition 28 in the annular groove 18 (Fig. 7) blocks off direct communication between the passage 33 and passage 47, while direct communication between the passages 32 and 38, 41 and 50, 44 and 51 is blocked off by the partitions 29, 30, and 31 respectively so that lubricant must always flow from the reservoir upward around one of the annular grooves before it can be discharged into the air line. The ports 38 and 41 communicate with the annular grooves 19 and 20 respectively at points diametrically opposite from the points of communication of the passages 47 and 51 with the grooves 18 and 21 respectively.

Now referring to the specific structure of the valve mechanism 12, it will be noted that shown in Figs. 2, 3 and 5 and arranged in the valve chamber 15 is a cylindrical valve guide 60 held in position by a threaded plug 61 and adjustable by a screw driver slot 62. Slidably mounted on this valve guide 60 is a sleeve valve 63. Formed in the valve guide 60 and controlled by the sleeve valve are parallel longitudinally extending passages 64 and 65, the former communicating with the passage 14 while the latter communicates with the passage 13. The passage 64 adjacent one end communicates with a radial port 66 opening towards the discharge connection 6, and adjacent its other end with an oppositely extending radial port 67. The passage 65 communicates with similarly located oppositely extending radial ports 68 and 69. The ports 66 and 68 are open when the ports 67 and 69 are closed by the valve 63. When the valve is in its opposite position, the ports 66 and 68 are closed while the ports 67 and 69 are open. By rotating the valve guide 60, it is possible to vary the angular position of the radial ports 66, 67, 68 and 69 with respect to the longitudinal median line of the lubricator, thereby to vary the velocity of air flow therethrough and the suction created as the air pressure flows past the valve guide.

When the lubricator is in the position shown in Fig. 2 and as illustrated diagrammatically in Fig. 16, with air under pressure flowing through the air line, air pressure flows through the port 68 and passage 65 in the valve guide 60 and through passages 13 and 16, port 50, annular groove 20, port 41, passage 35 and passage 43 communicating with the top of the lubricator reservoir 8, while the bottom of the reservoir is connected through passage 46, longitudinal passage 36, port 44, annular groove 21, passage 51, passage 17, passage 14, passage 64 and radial port 66 with the air line. The pressure flowing to the lubricant reservoir at the top of the lubricator casing acts on the upper surface of the lubricant and, due to the relatively low pressure and the suction created at the discharge opening of the radial ports 66 and the direction of air flow through the conduit 7 (see the arrow in Fig. 2), lubricant is forced from the reservoir through the lubricant discharge passages into the air line, and as the air under pressure is supplied to the air line, lubricant is constantly fed automatically thereto. However, when the supply of air under pressure to the air line is shut off, flow of lubricant from the reservoir is prevented due to the upward bend of the annular groove 21, it being impossible for the lubricant to flow upwardly around this groove without the action of the air pressure flowing through the conduit 7 and the suction created by such air flow past the valve guide. The passages 46 and 49 communicating at the opposite ends of the lubricant reservoir enable the lubricator casing to be tilted in an endwise direction while still permitting flow of lubricant from the reservoir through one or the other of these passages, while air pressure is supplied to the upper surface of the lubricant through one or the other of the passages 43 and 40 respectively communicating with the opposite ends of the reservoir. When the lubricator is turned upside down from the position shown in Fig. 2, the passage 17 then acts as an air passage, while the passage 16 acts as the lubricant discharge passage. When the lubricator is turned about its longitudinal axis through 90° in either direction, air pressure is supplied to the reservoir and lubricant is discharged therefrom through the other sets of passages. For instance, if the lubricator casing were turned on its side with the ports 52 and 54 (Figs. 9 and 10) at the bottom of the casing with the ports 53 and 55 at the top of the casing and the valve 63 in its opposite position, air under pressure would then flow through the port 67 and passage 64, passage 14, passage 17, port 51, annular groove 21, port 44, passage 36, port 45, groove 23 and passage 53 then communicating with the top of the reservoir, while lubricant discharges from the reservoir through port 52, groove 22, port 42, passage 35, port 41, groove 20, port 50, passage 16, passage 13 and the passage 65 and port 69 in the valve guide 60. If the lubricator were tilted upside down from this turned position, the passage 52 would then act as the air inlet, while the passage 53 woud act as the lubricant discharge. As the ports 52 and 53 communicate with the semi-circular grooves 22 and 23 and the passages 54 and 55 communicate with the semi-circular grooves 24 and 25, and due to the arrangement of the passages, the lubricator may be turned in any desired position about its longitudinal axis, while flow of air to the reservoir and lubricant discharge from the reservoir are maintained. If the lubricator were supported in an endwise position with the valve mechanism at either end of the lubricator, air pressure would flow to the lubricator casing and lubricant would be discharged therefrom in the manner described above in regard to the horizontal position. Also when the lubricator is in this end position and the air pressure to the air line is shut off, the then vertical passages would prevent any flow of lubricant from the reservoir to the air line. The sleeve valve 63 is at most times in one or the other of its opposite positions irrespective of the angular and endwise tilted position of the lubricator casing but in case the valve should assume an intermediate position on the valve guide, the valve is of such length as to never cover all the ports at the same time so that the device will at all times function mainly because of the vibrative action set up within the lubricator by the pressure fluctuations in the air line. If such intermediate position is assumed by the sleeve valve 63 the operator may move the same into either of its end positions simply by shaking or jarring the lubricator so that the device will aways function, but for all practical purposes such an intermediate position of the valve is never likely to be assumed. If it is desired to fill the lubricant reservoir, this may be accomplished simply by removing the filler plug 9, while adjustment of the valve guide 60 may be had simply by removing the plug 61 and inserting a screw driver blade within the slot 62. By rotating the valve guide, flow of lubricant from the reservoir to the air line may be regulated.

In the form of the invention shown in Fig. 14, the structure is identical to that described above with the exception of a slight modification in the valve mechanism 12. In this modified construction, the sleeve valve is omitted and the valve guide then acts as a valve chest and is indicated at 73. The element 73 is provided with a valve chamber 74 communicating at one end through an axial passage 75 with the passage 13 and at its other end through an axial passage 76 with passage 14. Communicating with the passages 75 and 76 are radial ports 77 and 78 respectively, while communicating with the valve chamber 74 intermediate its ends is a port 79. Arranged within the valve chamber 74 and controlling communication between the valve chamber and the passages 75 and 76 is a ball valve 80. When the valve mechanism is in the position shown in Fig. 14, pressure fluid flows to the lubricant reservoir through the air conduit 7, through port 79, valve chamber 74 and axial passage 75 communicating with the passage 13, while lubricant is discharged from the reservoir through passage 14, axial passage 76 and radial port 78, the valve 80 then being seated to close communication between passage 76 and the valve chamber 74. When the lubricator casing is in an inverted position, the passage 75 and port 77 act as the lubricant discharge, while the passage 76 acts as the air inlet. When the lubricator is placed on its side or in any desired intermediate position, the valve 80 is always held seated by air pressure to close one or the other of the passages 75, 76. Otherwise this form of the invention is identical to that described above.

In the modified construction shown in Fig. 15 the automatic valve mechanism is entirely omitted and a pressure differential is attained between the air supply and lubricant discharge passages by means of an adjustable plug 81 traversed by passages 82 and 83 of different size and held in adjusted position by means of a plug 84. The oil discharge passage 17, in this form of the invention, communicates with the annular groove 18 with which the passage 13 also communicates, and the passage 14 in the form of the invention described above is omitted. The passages in this plug 81 restrict the flow of pressure fluid through the air inlet passages 13 and 16 to the lubricant reservoir and, due to their restricted size, prevent any substantial fluctuations in pressure within the reservoir, and, as a result, a substantially constant pressure acts on the surface of the lubricant, thereby forcing the lubricant through the discharge passage 17 and through groove 18 and passage 13 to the air conduit, the pressure at the discharge end of the discharge passage being substantially lower than that in the reservoir, due to the velocity of air flow and pressure fluctuations through the conduit 7. By rotating the plug 81, the size of the effective area of the openings of the passages 82 and 83 may be varied to obtain the desired pressure differential.

As a result of this invention, it will be noted that an improved lubricator is provided which may be disposed in any desired position and provide in such position for the flow of lubricant. It will further be noted that an improved lubricator is provided particularly adapted to use in the air supply line of air operated tools. It will still further be noted that, due to the improved passage arrangement, flow of lubricant to the air line, when the air supply to the air line is shut off, is automatically prevented, thereby eliminating the possibility of the undesirable emptying of the lubricant reservoir into the air line when the air tool to be lubricated is idle. These and other uses and advantages of the improved lubricator will be clearly apparent to those skilled in the art.

While there are in this application specifically described one form and two modifications thereof which this invention may assume in practice, it will be understood that this form and the modifications thereof are shown for purposes of illustration and that the invention may be modified and embodied in various other forms without departing from its spirit or the scope of the appended claims.

What I claim as new and desire to secure by Letters Patent is:

1. In a lubricator, a casing having a lubricant reservoir and an air conducting passage, and means for supplying lubricant from said reservoir to said air passage during flow of air under pressure through the latter and in any angular and endwise tilted positions of the lubricator and including a plurality of air supply and lubricant discharge passages, two of said passages communicating with one end of said reservoir each at a plurality of points spaced equally about the reservoir and two communicating with the other end of the reservoir each at a plurality of points spaced equally about the reservoir, each of said passages acting as a lubricant discharge passage or as an air supply passage dependent upon the angular position of the lubricator.

2. In a lubricator, a casing having a lubricant reservoir and an air conducting passage, and means for supplying lubricant from said reservoir to said air passage during flow of air under pressure through the latter and in any angular and endwise tilted positions of the lubricator and including a plurality of air supply and lubricant discharge passsages, two of said passages communicating with one end of said reservoir each at a plurality of points spaced equally about the reservoir and two communicating with the other end of the reservoir each at a plurality of points spaced equally about the reservoir, each of said passages acting as a lubricant discharge passage or as an air supply passage dependent upon the angular position of the lubricator, said means automatically preventing flow of lubricant from said reservoir when the supply of air pressure to said air passage is shut off.

3. In a lubricator, a casing having a lubricant reservoir and an air conducting passage, and means for supplying lubricant from said reservoir to said air passage during flow of air under pressure through the latter and in any angular and endwise tilted positions of the lubricator and including air supply and lubricant discharge passages respectively communicating with the opposite ends of and at different angularly spaced points with the lubricant reservoir, said passages communicating with each end of the reservoir at a plurality of points spaced equally about the reservoir and each of said passages acting as a lubricant discharge passage or as an air supply passage dependent upon the angular position of the lubricator.

4. In a lubricator, a cylindrical casing having a lubricant reservoir and an air conducting passage, and means for supplying lubricant from said reservoir to said air passage in any angular position of the lubricator about its longitudinal axis including passage means communicating with the reservoir at a plurality of circumferentially spaced points for supplying air pressure to the reservoir, and lubricant discharge passage means communicating with the reservoir likewise at a plurality of circumferentially spaced points, said supply and discharge passage means being formed immovable with respect to said casing and including passages communicating with the ends of the reservoir at points spaced equally about each end of the reservoir and all of said passage means communicating with said air passage.

5. In a lubricator, a casing having a lubricant reservoir and an air conducting passage extending therethrough, and means for supplying lubricant from said reservoir to said air passage in any angular position of the lubricator about its longitudinal axis including lubricant discharge and air supply passages communicating with the reservoir at different angularly related points spaced equally about the reservoir so that when the casing is turned about its axis always one passage communicates with the top and another with the bottom of the reservoir and each of said passages acting as a lubricant discharge passage or as an air supply passage dependent upon the angular positon of the lubricator about its longitudinal axis.

6. In a lubricator, a casing having a lubricant reservoir and having an air conducting passage extending therethrough, and means for supplying lubricant from said reservoir to said air passage in any angular position of the lubricator about its longitudinal axis and endwise tilted positions of the lubricator including lubricant discharge and air supply passages communicating with the reservoir at longitudinally spaced points and at different angularly related points, said passages communicating with the reservoir at points spaced equally about the reservoir at each end thereof so that when the casing is turned about its axis or tilted endwise, always one passage communicates with the top and another with the bottom of the reservoir and each of said passages acting as a lubricant discharge passage or as an air supply passage dependent upon the angular position of the lubricator about its longitudinal axis.

7. In a lubricator, a casing having a lubricant reservoir and an air conducting passage, and means for supplying lubricant from said reservoir to said air passage including air conducting and lubricant discharge passages formed in and extending longitudinally of the casing, circular passages also formed in said casing at one end thereof and at least encircling a portion of said reservoir and with which said longitudinally extending passages respectively communicate, passage means including passages parallel with said longitudinally extending passages, and passage means for connecting said last mentioned longitudinal passages with the reservoir at the end of the casing remote from said circular passages.

8. In a lubricator, a cylindrical casing having therein a lubricant reservoir and an air conducting passage extending centrally therethrough, and means for supplying lubricant from said reservoir to said air passage during flow of air under pressure through the latter and in any supported position of the lubricator and including a plurality of passages formed immovable with respect to said casing, two of said passages communicating with one end of the reservoir each at a plurality of points spaced equally about the reservoir and two communicating with the other end of the reservoir each at a plurality of points spaced equally about the reservoir and all of said passages communicating with said air passage.

9. In a lubricator, a casing having a lubricant reservoir and an air conducting passage, and means for supplying lubricant from said reservoir to said air passage during flow of air under pressure through the latter and in any angular position of the lubricator about its longitudinal axis including air supply and lubricant discharge passages extending longitudinally of the casing and communicating with the reservoir at the top, bottom and sides thereof at points spaced equally about the reservoir at each end of the reservoir and each of said passages acting as a lubricant discharge passage or as an air supply passage dependent upon the angular position of the lubricator about its longitudinal axis.

10. In a lubricator, a casing having a lubricant reservoir and an air conducting passage, and means for supplying lubricant from said reservoir to said air passage during flow of air under pressure through the latter and in any supported position of the lubricator including air supply and lubricant discharge passages communicating with the reservoir at the top, bottom and sides thereof at points spaced equally about the reservoir at each end of the reservoir and each of said passages acting as a lubricant discharge passage or as an air supply passage dependent upon the supported position of the lubricator.

11. In a lubricator, a casing having a lubricant reservoir and an air conducting passage, and means for supplying lubricant from said reservoir to said air passage during flow of air under pressure through the latter and in any angular position of the lubricator about its longitudinal axis including air supply and lubricant discharge passages communicating with the reservoir at the top, bottom and sides thereof and at each end of the reservoir, said passages each communicating with arcuate conduits, one individual to each passage, and each arcuate conduit at least partially encircling the reservoir so that the lubricant must flow upwardly around an arcuate conduit to discharge thereby to prevent automatically lubricant flowing from said reservoir to said air conducting passage when the supply of air pressure to the latter is shut off.

12. In a lubricator, a casing having a lubricant reservoir and an air conducting passage, and means for supplying lubricant from said reservoir to said air passage during flow of air under pressure through the latter and in any supported position of the lubricator including air supply and lubricant discharge passage means communicating with the reservoir at the top, bottom and sides thereof and at each end of the reservoir, said passage means each being formed with a loop portion at least partially encircling the reservoir so that the lubricant must flow upwardly around these loop portions to discharge thereby to prevent automatically lubricant flowing from the reservoir to said air conducting passage when the supply of air pressure to the latter is shut off.

13. In a lubricator, a cylindrical casing forming a lubricant reservoir and having an air conducting passage extending centrally therethrough, and means for supplying lubricant from said reservoir to said air passage in any supported position of the lubricator including arcuate conduits at least partially encircling the reservoir adjacent the ends of said casing, there being formed two arcuate conduits at each end of the casing, passages connecting said arcuate conduits with said reservoir, and passages leading to said air conducting passage and communicating with said arcuate conduits, the lubricant discharging from said reservoir always flowing through one of said arcuate conduits.

14. In a lubricator, a casing having a lubricant reservoir and an air conducting passage, and means for supplying lubricant from said reservoir to said air passage during flow of air under pressure through the latter and in any supported position of the lubricator including a plurality of passages either adapted to act as an air passage or a lubricant discharge passage, and valve mechanism for automatically connecting said passages either to the air supply or lubricant discharge upon turning of the lubricator in either of two opposite positions.

15. In a lubricator, a casing having a lubricant reservoir and an air conducting passage, and means for supplying lubricant from said reservoir to said air passage during flow of air under pressure through the latter and in any supported position of the lubricator including air supply and lubricant discharge passages communicating with the reservoir, and a valve mechanism for controlling said passages, each of said passages acting as a lubricant discharge passage or as an air supply passage dependent upon the supported position of the lubricator.

16. In a lubricator, a casing having a lubricant reservoir and an air conducting passage, and means for supplying lubricant from said reservoir to said air passage during flow of air under pressure through the latter and in any supported position of the lubricator including air supply and lubricant discharge passages communicating with the reservoir at points spaced equally about the reservoir at each end thereof, and a slide valve for controlling said passages, said slide valve when the lubricator is in one supported position closing one passage and when the lubricator is in a different supported position closing the other passage.

17. In a lubricator, a casing having a lubricant reservoir and an air conducting passage, and means for supplying lubricant from said reservoir to said air passage during flow of air under pressure through the latter and in any supported position of the lubricator including air supply and lubricant discharge passages communicating with the reservoir and a slide valve for controlling said passages, said slide valve moving into either of its two opposite positions when the lubricator is supported in either of two opposite supported positions.

18. In a lubricator, a cylindrical casing having a lubricant reservoir and an air conducting passage, and means for supplying lubricant from said reservoir to said air passage including passage means communicating with the reservoir for supplying air pressure thereto and for discharging lubricant therefrom, said passage means also communicating with said air passage and including passages extending longitudinally of the casing and communicating passages each in the form of a loop, two at each end of the reservoir and each at least partially encircling the reservoir and communicating with the latter at a plurality of circumferentially spaced points.

19. In a lubricator, a cylindrical casing having a lubricant reservoir and an air conducting passage, and means for supplying lubricant from said reservoir to said air passage including passage means communicating with the reservoir for supplying air pressure thereto and for discharging lubricant therefrom, said passage means also communicating with said air passage and including passages extending longitudinally of the casing and communicating passages each in the form of a loop, two at each end of the reservoir and each at least partially encircling the reservoir and communicating with the latter at a plurality of circumferentially spaced points spaced equally about the reservoir, one passage always communicating with the bottom of the reservoir and another with the top thereof irrespective of the angular position of the lubricator about its longitudinal axis.

20. In a lubricator, a cylindrical casing having a lubricant reservoir and an air conducting passage, and means for supplying lubricant from said reservoir to said air passage including passage means communicating with the reservoir for supplying air pressure thereto and for discharging lubricant therefrom, said passage means also communicating with said air passage and including passages extending longitudinally of the casing and communicating passages each in the form of a loop, two at each end of the reservoir and each at least partially encircling the reservoir and communicating with the latter at a plurality of circumferentially and longitudinally spaced points, said circumferentially spaced points being spaced equally about the reservoir, one passage always communicating with the bottom of the reservoir and another with the top thereof irrespective of the angular position of the lubricator about its longitudinal axis and the endwise tilted position of the lubricator.

21. In a lubricator, a casing having a lubricant reservoir and an air conducting passage, and means for supplying lubricant from said reservoir to said air passage in any supported position of the lubricator including a plurality of passages formed immovable with respect to said casing and communicating with the air passage, two of said passages communicating with one end of the reservoir each at a plurality of points spaced equally about the reservoir and two communicating with the other end of the reservoir each at a plurality of points spaced equally about the reservoir.

22. In a lubricator, a casing having a lubricant reservoir and an air conducting passage, and means for supplying lubricant from said reservoir to said air passage in any supported position of the lubricator including four combined air supply and lubricant discharge passage means, all of said passage means communicating with said air conducting passage at one end of the casing, two of said passage means at said end of the lubricator extending in the form of a loop nearly around the casing and then longitudinally of the casing to the other remote end of the casing and communicating with the reservoir at said latter end at a plurality of points spaced about the reservoir and the other two passage means extending longitudinally of the casing to said remote end thereof and at said remote end extending in the form of a loop nearly around the casing and then rearwardly toward the first mentioned end of the casing and communicating with the reservoir at said latter end at a plurality of spaced points.

23. In a lubricator, a cylindrical casing having a lubricant reservoir and an air conducting passage, and means for supplying lubricant from said reservoir to said air passage in any supported position of the lubricator including a pair of passage means extending longitudinally of the casing and each having at one end of the casing a portion in the form of a loop extending nearly around the casing and then extending longitudinally to the opposite end of the casing and communicating with the reservoir at said latter end at a plurality of points.

24. In a lubricator, a casing having a lubricant reservoir and an air conducting passage, and means for supplying lubricant from said reservoir to said air passage during flow of air under pressure through the latter and in any angular and endwise tilted positions of the lubricator and including a plurality of air supply and lubricant discharge passages, two of said passages communicating with one end of said reservoir each at a plurality of points spaced equally about the reservoir and two communicating with the other end of the reservoir each at a plurality of points spaced equally about the reservoir, one of said passages acting as a lubricant discharge passage when the lubricator is in one angular position and as an air supply passage when the lubricator is in a different angular position.

25. In a lubricator, a casing having a lubricant reservoir and an air conducting passage, and means for supplying lubricant from said reservoir to said air passage during flow of air under pressure through the latter and in any supported position of the lubricator including air supply and lubricant discharge passages communicating with the reservoir at the top, bottom and sides thereof at points spaced equally about the reservoir at each end of the reservoir and one of said passages acting as a lubricant discharge passage when the lubricator is in one supported position and as an air supply passage when the lubricator is in a different supported position.

26. In a lubricator, a casing having a lubricant reservoir and an air conducting passage, and means for supplying lubricant from said reservoir to said air passage during flow of air under pressure through the latter and in any supported position of the lubricator including air supply and lubricant discharge passages communicating with the reservoir, and a valve mechanism for controlling said passages, one of said passages acting as a lubricant discharge passage when the lubricator is in one supported position and as an air supply passage when the the lubricator is in a different supported position.

ELMER G. GARTIN.